United States Patent
Egedal

(10) Patent No.: US 8,155,920 B2
(45) Date of Patent: Apr. 10, 2012

(54) METHOD FOR THE DETERMINATION OF A NACELLE-INCLINATION

(75) Inventor: Per Egedal, Herning (DK)

(73) Assignee: Siemens Aktiengesellschaft, Munich (DE)

( * ) Notice: Subject to any disclaimer, the term of this patent is extended or adjusted under 35 U.S.C. 154(b) by 444 days.

(21) Appl. No.: 12/480,068

(22) Filed: Jun. 8, 2009

(65) Prior Publication Data

US 2010/0063769 A1  Mar. 11, 2010

(30) Foreign Application Priority Data

Jun. 9, 2008  (EP) ..................... 08010478

(51) Int. Cl.
*G01M 1/00* (2006.01)
*G06F 19/00* (2006.01)
*G06F 17/40* (2006.01)

(52) U.S. Cl. .............. 702/154; 73/455; 73/457; 416/61; 702/187; 702/189; 708/105; 708/200

(58) Field of Classification Search ........... 73/66, 432.1, 73/455, 457, 482; 340/500, 540, 665, 679, 340/686.1, 689; 416/61; 702/1, 33, 127, 702/150, 154, 182, 183, 187, 189; 708/100, 708/105, 131, 160, 200
See application file for complete search history.

(56) References Cited

U.S. PATENT DOCUMENTS 4,435,647 A  *  3/1984  Harner et al. .................. 290/44

FOREIGN PATENT DOCUMENTS

| DE | 297 15 248 U1 | 2/1999 |
| EP | 0 008 584 A1 | 3/1980 |
| EP | 0 995 904 A2 | 4/2000 |
| EP | 2133563 A1 * | 12/2009 |
| WO | WO 02/075153 A1 | 9/2002 |

* cited by examiner

*Primary Examiner* — Edward Cosimano

(57) ABSTRACT

In one aspect, a method for the determination of a nacelle-inclination is provided. A first difference-signal is formed from the difference of a measured nacelle acceleration and an offset-value from a calibration. A second difference-signal is formed from a difference of the first difference-signal and a feedback signal. A first sum-signal is formed from adding an integrated second difference-signal with the product of the second difference signal and a factor. A second sum signal is formed from adding an integrated first sum-signal with the product of the first-sum-signal and the factor. A corrected signal is formed by a product of the second sum-signal and an equivalent tower height. A first nacelle-signal is formed by the arc-tangent of the corrected signal. A nacelle inclination is obtained from filtering the first nacelle-signal by a low-pass-filter. The feedback-signal is formed by multiplying the acceleration of gravity with the sine of the first nacelle-signal.

11 Claims, 3 Drawing Sheets

METHOD FOR THE DETERMINATION OF A NACELLE-INCLINATION

CROSS REFERENCE TO RELATED APPLICATIONS

This application claims priority of European Patent Office application No. 08010478.9 EP filed Jun. 9, 2008, which is incorporated by reference herein in its entirety.

FIELD OF INVENTION

The invention refers to the determination of a nacelle-inclination of a wind-turbine.

BACKGROUND OF INVENTION

It is known to estimate the nacelle-inclination with help of a measured acceleration. As the nacelle is mounted on top of a mast, a strong force, which is caused by wind, acts on the nacelle and bends the tower.

Because of this, the nacelle inclination is changed. The steady state inclination phi can be measured by:

$$\text{phi} = \arcsin(a\_y/g), \text{ with:}$$

phi as inclination,
g as force or gravity acceleration, and
a_y as measured force or measured acceleration along the nacelle.

SUMMARY OF INVENTION

The forces caused by acceleration of the nacelle will be part of the acceleration signal and therefore disturb the calculation of the inclination.

Additionally if the nacelle acceleration has to measured with an accelerometer in the nacelle, the gravity will act as disturbance on the measurement, when inclination is changed.

Therefore it is the aim of the present invention, to provide an improved method for the estimation of a nacelle-inclination.

In a second employment it is a further aim of the present invention, to provide an improved method for the estimation of the nacelle acceleration, so the acceleration and the inclination can be separated.

This problem is solved by the features of the dependent claims. Preferred embodiments of the invention are object of the subsequent claims.

According to the claimed invention a method is provided to determine a nacelle-inclination of a wind-turbine. An acceleration of the nacelle is measured. An offset-value, resulting from a calibration, is determined.

A first difference-signal is calculated by subtraction of the offset-value from the measured acceleration. A second difference-signal is calculated by subtraction of a feedback-signal from the first difference-signal. The second difference-signal is integrated to calculate a first integrated signal. The second difference-signal is multiplied by a factor Kff, which results from the calibration, to calculate a first corrected signal.

The first corrected signal and the first integrated signal are summed to calculate a first sum-signal. The first sum-signal is integrated to calculate a second integrated signal. The first sum-signal is multiplied by the factor Kff to calculate a second corrected signal.

The second integrated signal and the second corrected signal are summed, to calculate a second sum-signal. The second sum-signal is multiplied with an equivalent tower height to calculate a third corrected signal.

The arc-tangent of the third corrected signal is calculated to get a first nacelle-signal.

The first nacelle-signal is fed to a low-pass-filter to calculate the nacelle inclination by filtering.

The sine of the first nacelle-signal is calculated and the result is multiplied with the gravity-acceleration to calculate the feedback-signal.

The inventive method leads to an improved determination of the nacelle-inclination, with minimized influence or in best case without the influence of the gravity-force on the nacelle.

The accurate nacelle-inclination can be used for vibration-damping of the wind-turbine.

The nacelle-inclination or the nacelle-position can be used for thrust-control or for inclination control.

The nacelle-inclination or the nacelle-position can also be used for fatigue calculation of the tower or mast.

The accelerometer being used for the invention is able to measure accelerations down to 0, so it is possible to measure the gravity acceleration component due to inclination. Afterwards it is possible, to separate the gravity acceleration component from the measured acceleration signal and to use the result for an improved estimation of nacelle-position and of nacelle-inclination as described in the preceding.

BRIEF DESCRIPTION OF THE DRAWINGS

The invention will be described in more detail by the following drawings, where.

DETAILED DESCRIPTION OF INVENTION

Figure 1:
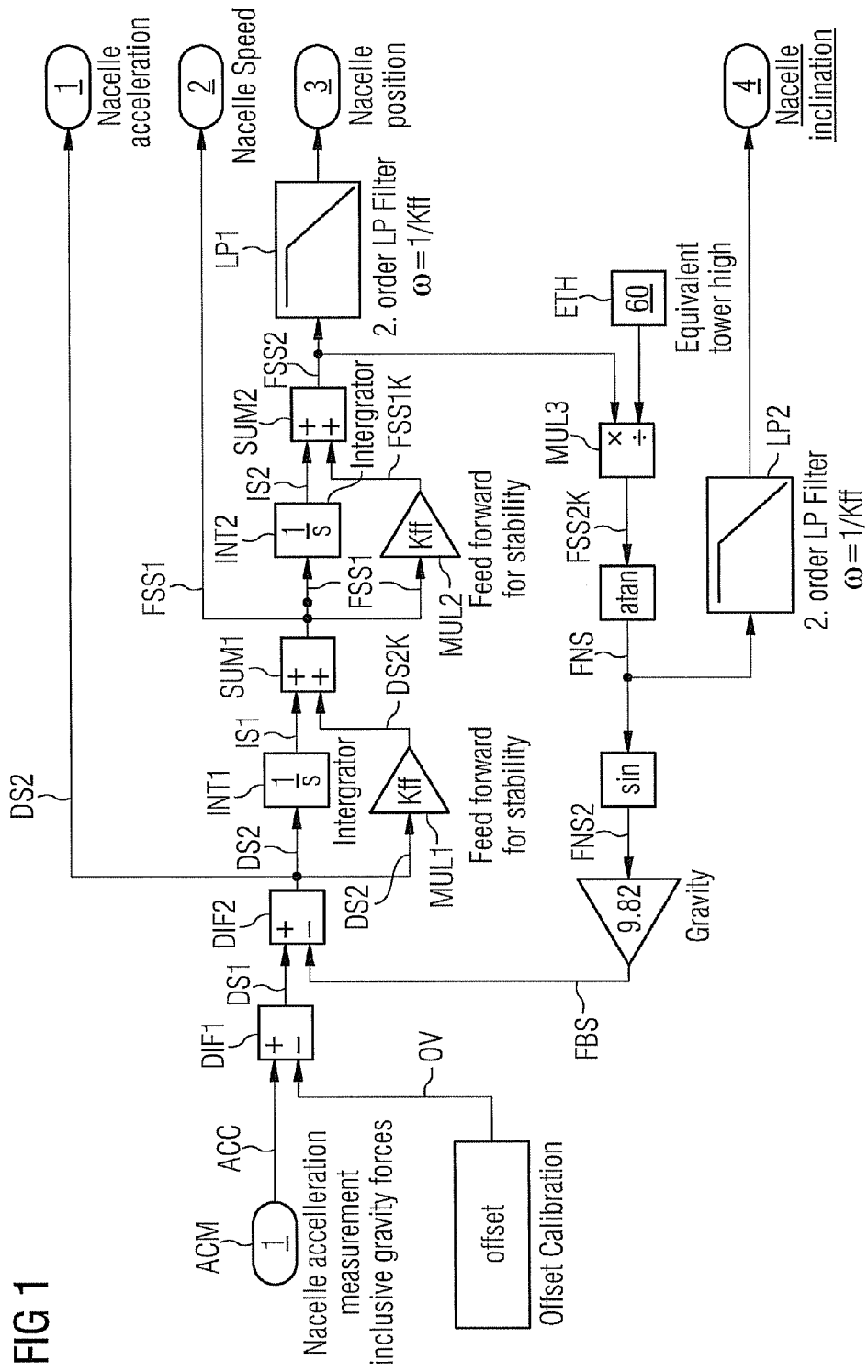
FIG. 1 shows the inventive method based on a principle block-diagram.

According to the invention, as shown in FIG. 1, an acceleration ACC of a nacelle is measured with help of an accelerometer ACM, which is mounted—for example—within or at the nacelle. A conventional two-axis-accelerometer can be used as accelerometer The measured acceleration is brought as first input-signal to a first difference-element DIF1.

An offset-value OV, which is necessary for calibration, is brought as second input-signal to the first difference-element DIF1.

For the calibration purposes the position of the nacelle and of their wind-blades too is changed in that kind, that the wind-forces on the nacelle are minimized and therefore the inclination is also minimized.

It is also possible, to use estimated, pre-calculated values as offset-value OV. The offset-value OV can be calculated based on mean values of the accelerometer-output, when the rotating propeller-blades of the nacelle are stopped as described above.

Figure 4:
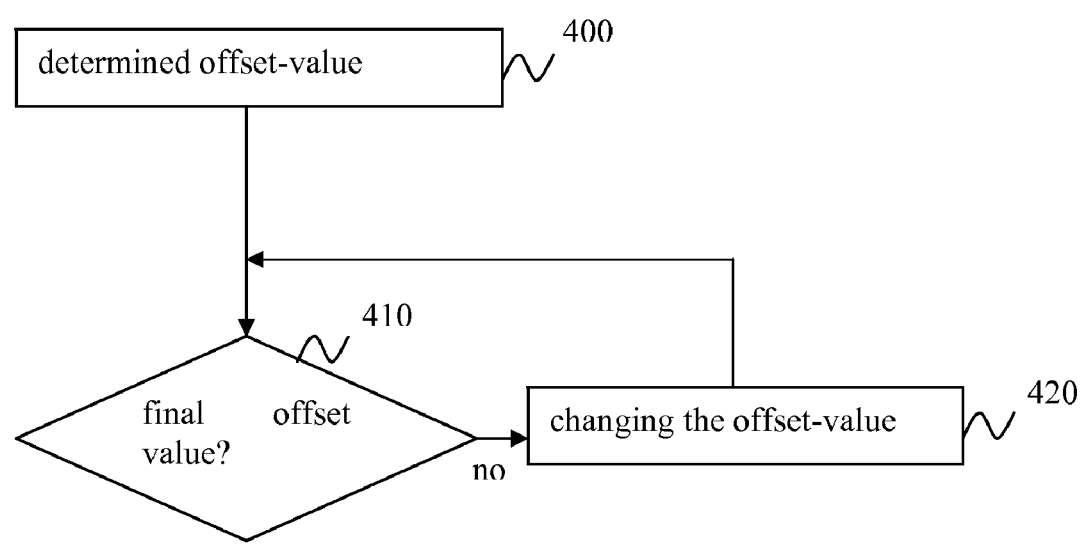
FIG. 4 illustrates changing the offset value according to one embodiment.

Referring also to FIG. 4, it is also possible to calculate the offset-value OV based on an "online closed loop calibration". Due to this, the offset-value OV 400 is changed 420 until a mean value of nacelle-position and/or nacelle-inclination is equal to expected values 410. The expected values form a function of turbine power on the one hand and of pitch position of the other hand.

The first difference-element DIF1 calculates a difference between the measured acceleration ACC and the offset-value OV, resulting in a first difference-signal DS1.

The first difference-signal DS1 is brought as first input-signal to a second difference-element DIF2.

A feedback-signal FBS, to be developed in the preceding, is brought as second input-signal to the second difference-element DIF2.

The second difference-element DIF2 calculates a difference between the first difference-signal DS1 and the feedback-signal FBS, resulting in a second difference-signal DS2.

This second difference-signal DS2 is used as estimated nacelle acceleration, generated without the influence of the gravity.

The second difference-signal DS2 is brought as input-signal to a first integrator INT1 and to a first multiplier MUL1, too.

The first integrator INT1 integrates the second difference-signal DS2 to form a first integrated signal IS1.

By the first multiplier MUL1 the second difference-signal DS2 is multiplied by a factor Kff, which is between 0 and 3.

In a preferred embodiment the factor Kff is 0.4 or 2.4.

This multiplication helps to stabilize the loop, described hereinafter. The best value of factor Kff can be chosen while calibration.

As a result of this multiplication a first corrected value DS2K is calculated.

The first corrected value DS2K and the first integrated signal IS1 are brought as input-signals to a first summation element SUM1, which calculates the sum of both signals DS2K and IS1. So a first sum-signal FSS1 is calculated.

This first sum-signal FSS1 is used as estimated nacelle speed, generated without the influence of the gravity.

The first sum-signal FSS1 is brought as input-signal to a second integrator INT2 and to a second multiplier MUL2, too.

The second integrator INT2 integrates the first sum-signal FSS1 to form a second integrated signal IS2.

By the second multiplier MUL2 the first sum-signal FSS1 is multiplied by the factor Kff, as described above.

As a result of this multiplication a second corrected signal FSS1K is calculated.

The second corrected signal FSS1K and the second integrated signal IS2 are brought as input-signals to a second summation element SUM2, which calculates the sum of both signals FSS1K IS2. So a second sum-signal FSS2 is calculated.

The second sum-signal FSS2 is fed to a second-order low-pass-filter LP1 with a natural frequency $\omega=1/Kff$ [rad/s].

In a preferred embodiment the value $1/Kff$ is 0.2 [rad/s].

It is also possible to use a first-order low-pass-filter with a natural frequency $\omega=1/Kff$ [rad/s].

This filtering results to a calculated nacelle position, generated without gravity influence.

The second sum-signal FSS2 is fed as first input-signal to a third multiplier MUL3, together with a value called "equivalent tower height" ETH as second input-signal.

In this embodiment a value of 60 meters is chosen as equivalent tower height ETH. The "equivalent tower height" ETH is explained later with reference to preceding FIG. 3.

By the third multiplier MUL3 the second sum-signal FSS2 is multiplied by the equivalent tower height ETH of "60 meter", resulting in a third corrected signal FSS2K.

The third corrected signal FSS2K is brought as input-signal to a calculation-element atan, which is calculating the arc-tangent of the third corrected signal FSS2K. Because of this a first nacelle-signal FNS is generated.

The first nacelle-signal FNS is fed to a second-order low-pass-filter LP2 with a natural frequency $\omega=1/Kff$ [rad/s].

In a preferred embodiment the value $1/Kff$ is 0.2 [rad/s].

It is also possible to use a first-order low-pass-filter with a natural frequency $\omega=1/Kff$ [rad/s].

This calculation or filtering results to the calculated nacelle inclination, generated without gravity influence.

The first nacelle-signal FNS is also fed to a calculation-element sin, which is calculating the sine of the first nacelle-signal FNS. Because of this a second nacelle-signal FNS2 is generated.

The second nacelle-signal FNS2 is multiplied by the gravity-factor 9.82 to calculate the feedback-signal FBS.

As described above, the feedback-signal FBS is brought as second input-signal to the second difference-element DIF2.

Figure 2:
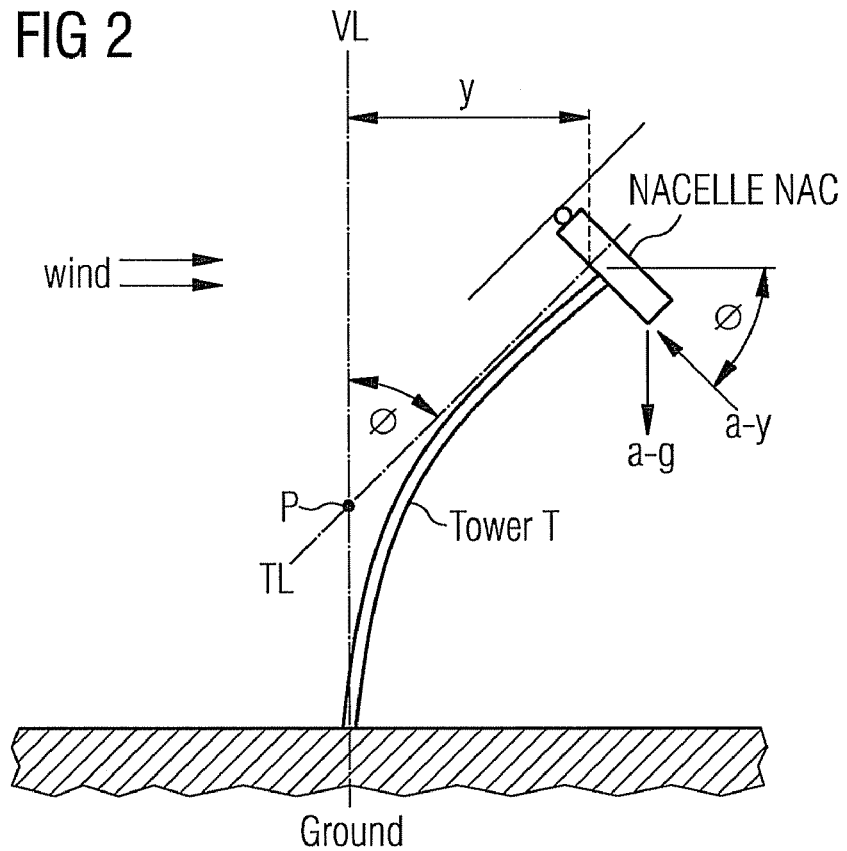
FIG. 2 shows a top view of a nacelle together with accelerations acting on the nacelle.

FIG. 2 shows a top view of a nacelle NAC together with accelerations a_g and a_y acting on the nacelle NAC.

Because of the wind the nacelle NAC and the tower T are bended away from a vertical-line VL. This results in a distance y.

A tangent-line TL is taken along the tower T near the nacelle NAC. The tangent-line TL hits the vertical line VL within a point P.

The angle ø between the vertical-line VL and the tangent-line TL is the inclination of the nacelle NAC.

The inventive method calculates the inclination ø as described above and also the acceleration a_y of the nacelle NAC, without being influenced by the gravity a_g.

Figure 3:
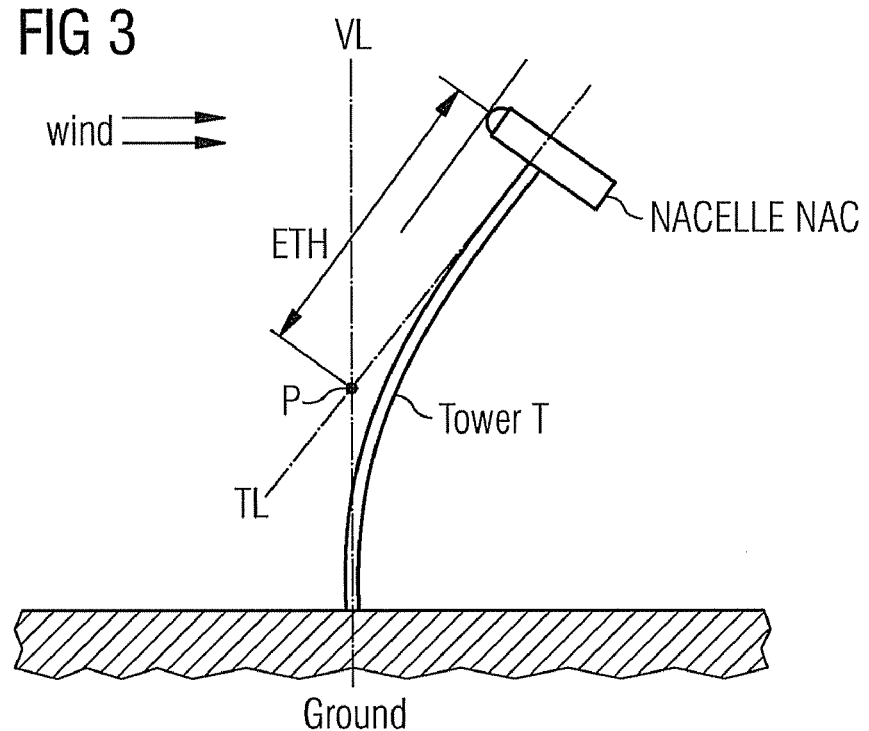
FIG. 3 shows a sketch of the nacelle, mounted on top of a mast to achieve the so called "equivalent tower height".

FIG. 3 shows a sketch of the nacelle NAC, mounted on top of a tower T to achieve the so called "equivalent tower height" ETH.

Because of the wind, the nacelle NAC and the tower T are bended away from a vertical line VL. A tangent-line TL is taken along the tower T near the nacelle NAC.

The tangent-line TL hits the vertical line VL within a point P. The distance between the nacelle and the point P is called as "equivalent tower height" ETH.

What is claimed:

1. Method for the determination of a nacelle-inclination of a wind-turbine, comprising:
   measuring an acceleration of the nacelle;
   determining an offset-value, resulting from a calibration;
   calculating a first difference-signal by subtracting the offset-value from the measured acceleration;
   calculating a second difference-signal by subtracting a feedback-signal from the first difference-signal;
   integrating the second difference-signal to form a first integrated signal;
   multiplying the second difference-signal by a factor to calculate a first corrected signal, the factor results from the calibration;
   adding the second difference-signal and the first corrected signal to form a first sum-signal;
   integrating the first sum-signal to calculate a second integrated signal;
   multiplying the first sum-signal by the factor to calculate a second corrected signal;
   adding the second corrected signal and the second integrated signal to form a second sum-signal;
   multiplying the second sum-signal with a equivalent tower height to calculate a third corrected signal;
   applying an arctangent of the third corrected signal is calculated to get a first nacelle-signal;
   filtering the first nacelle-signal by a low-pass-filter to calculate the nacelle inclination; and applying the sine of the first nacelle-signal and multiplying the result with a gravity-acceleration to calculate the feedback-signal.

2. The method according to claim 1, wherein the second difference-signal is used as estimated nacelle acceleration.

3. The method according to claim 1, wherein the first sum-signal is used as estimated nacelle speed.

4. The method according to claim 1, wherein the second sum-signal is fed to a second-order low-pass-filter, which shows a natural frequency $\omega=1/\text{factor}$ [rad/s], to calculate by filtering the nacelle position.

5. The method according to claim 1, wherein the low-pass-filter, which is used for the inclination-calculation, is a second-order low-pass-filter with a natural frequency of $\omega=1/\text{factor}$[rad/s].

6. The method according to claim 1, wherein the factor is in the range between 0 and 1.

7. The method according to claim 6, wherein the factor is 0.4.

8. The method according to claim 1, wherein the offset-value is determined when the position of the nacelle and the position of their wind-blades are changed, so wind-forces on the nacelle are minimized.

9. The method according to claim 8, wherein the offset-value is changed until a mean value of a nacelle-position and of a nacelle-inclination is equal to pre-calculated values.

10. The method according to claim 8, wherein the offset-value is changed until a mean value of a nacelle-position.

11. The method according to claim 8, wherein the offset-value is changed until a mean value of a nacelle-inclination is equal to pre-calculated values.

* * * * *